Dec. 29, 1931.  O. J. FROCK  1,838,668
DOUBLE ACTING HYDRAULIC BRAKE APPLYING APPARATUS
Filed May 6, 1930  4 Sheets-Sheet 1
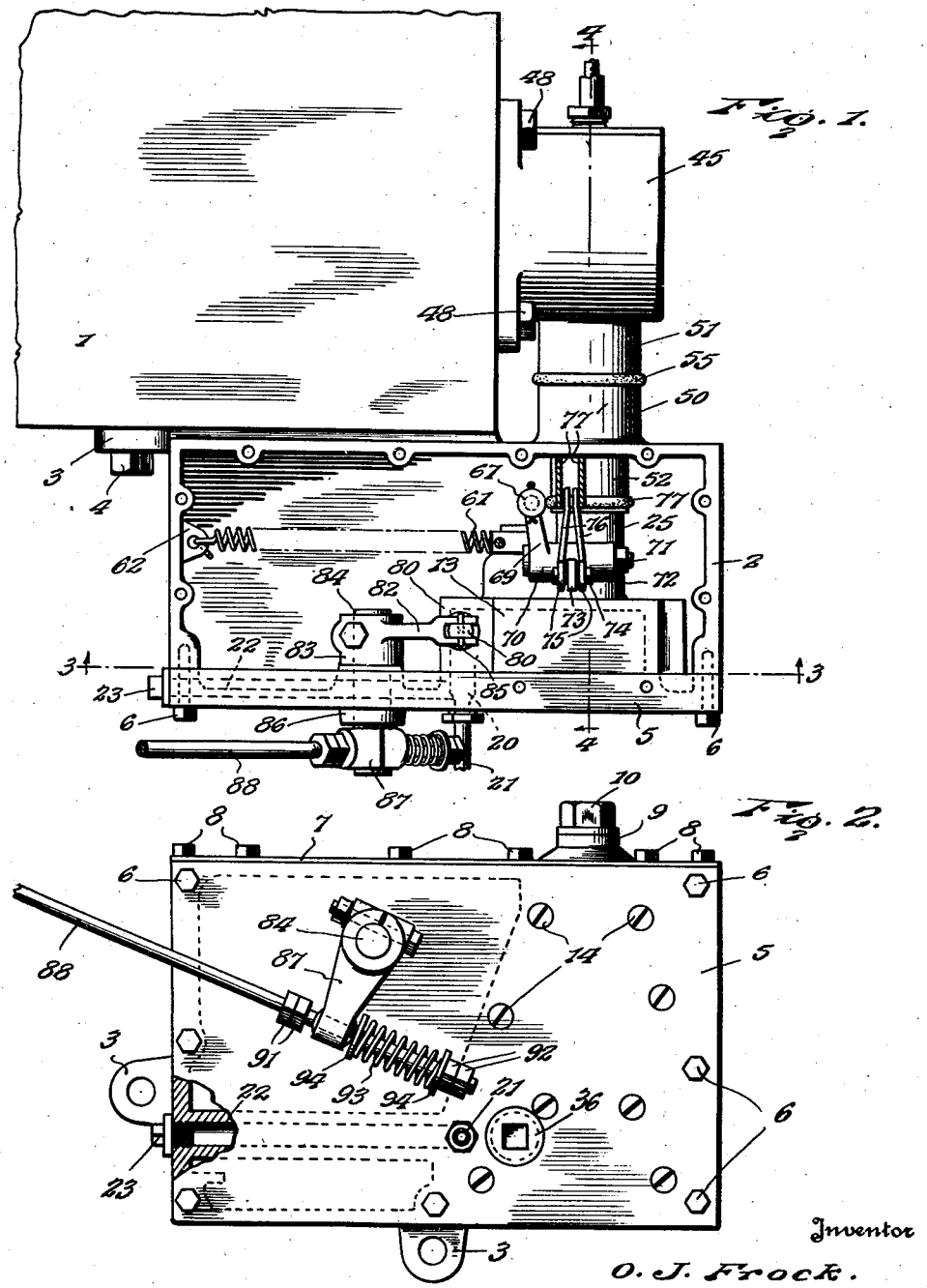
Inventor
O. J. Frock.

Dec. 29, 1931.  O. J. FROCK  1,838,668
DOUBLE ACTING HYDRAULIC BRAKE APPLYING APPARATUS
Filed May 6, 1930  4 Sheets-Sheet 2
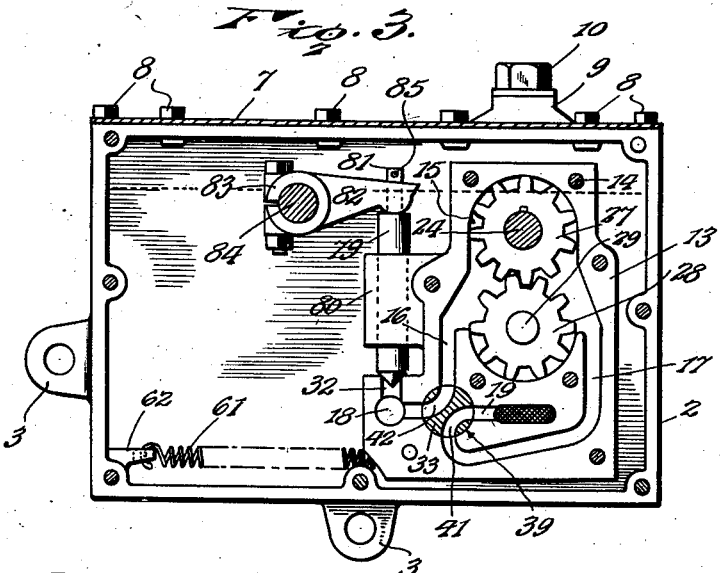
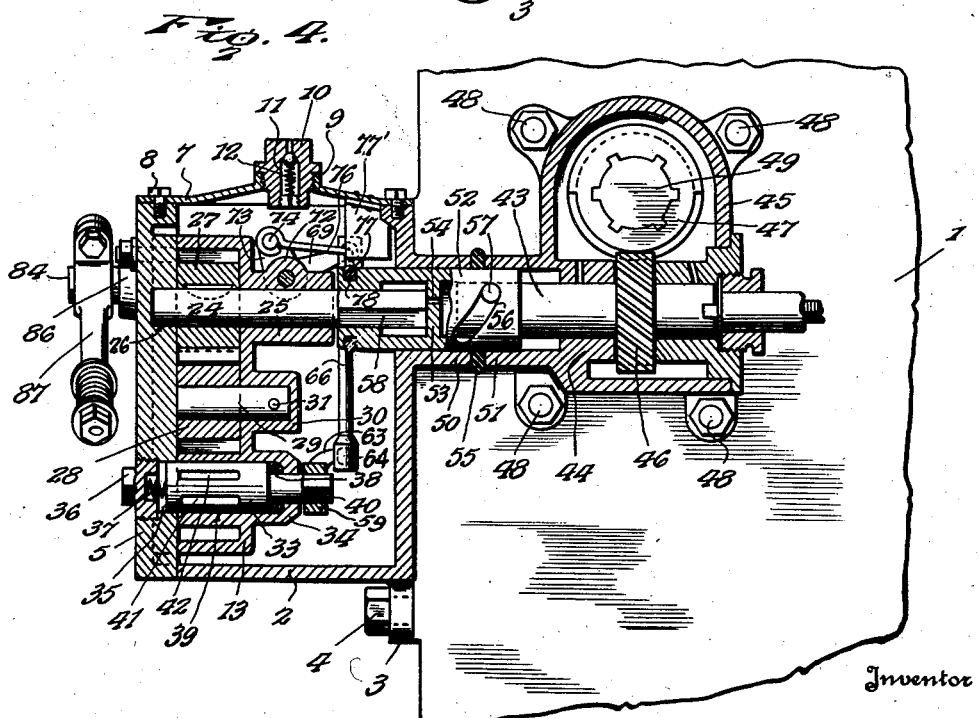
Inventor
O. J. Frock.
By Ross J. Woodward
Attorney Dec. 29, 1931.  O. J. FROCK  1,838,668
DOUBLE ACTING HYDRAULIC BRAKE APPLYING APPARATUS
Filed May 6, 1930    4 Sheets-Sheet 3
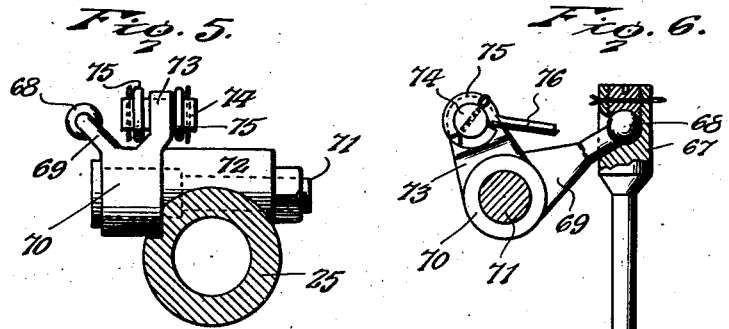
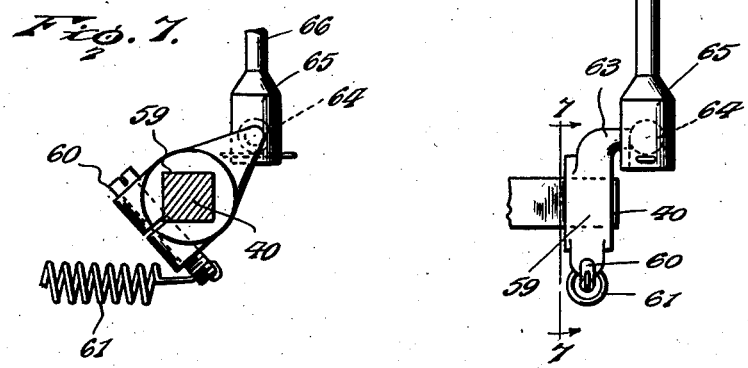
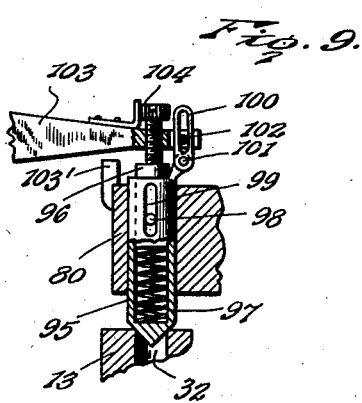
Inventor
O. J. Frock
By Ross J. Woodward
Attorney Dec. 29, 1931.　　　O. J. FROCK　　　1,838,668
DOUBLE ACTING HYDRAULIC BRAKE APPLYING APPARATUS
Filed May 6, 1930　　　4 Sheets-Sheet 4
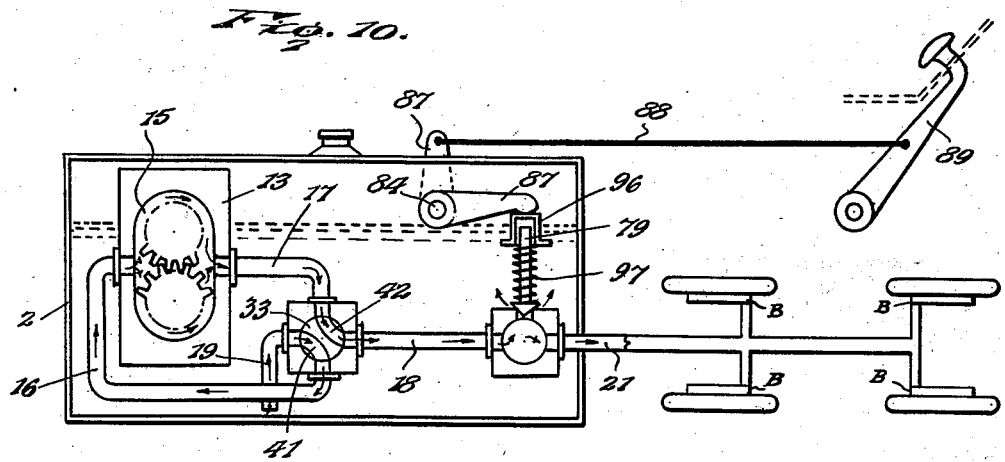
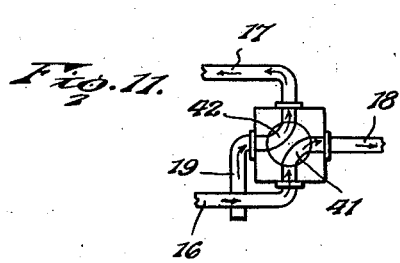
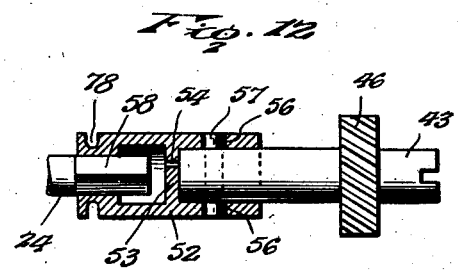
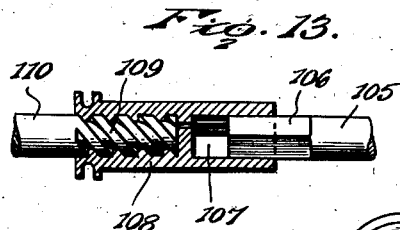
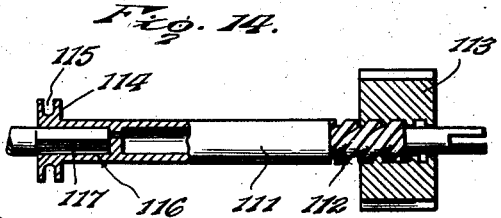
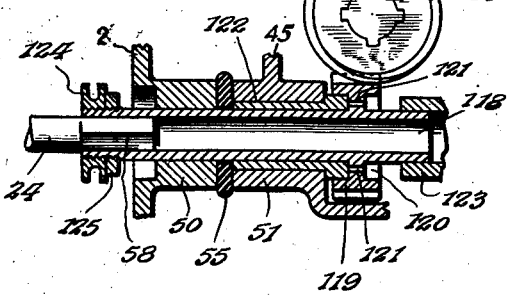
Inventor
O. J. Frock.

Patented Dec. 29, 1931

1,838,668

UNITED STATES PATENT OFFICE

OSCAR J. FROCK, OF PHILADELPHIA, PENNSYLVANIA

DOUBLE ACTING HYDRAULIC BRAKE APPLYING APPARATUS

Application filed May 6, 1930. Serial No. 450,179.

This invention relates to hydraulic brakes, and more particularly to a brake-applying apparatus through the medium of which pressure may be exerted when brakes are to be applied.

One object of the invention is to provide a brake applying apparatus actuated through the medium of a pump receiving its power from a rotating shaft or other rotary element of an automobile and controlled by a manually operated pedal or equivalent element within reach of the driver of the automobile.

Another object of the invention is to so construct the brake applying apparatus that when an automobile is moving either forwardly or rearwardly, fluid may be circulated through a pump and a reservoir in which the pump is located, and circulation of the fluid interrupted when the brakes are to be applied, in order that the pump may then serve as means for exerting pressure upon fluid in a conduit leading to the brakes.

Another object of the invention is to permit the brakes to be applied by very light pressure upon a control pedal, thereby reducing effort on the part of the operator of the automobile.

Another object of the invention is to so form this brake applying apparatus that expansion or contraction of any flexible tubing carrying fluid to the brakes or temperature changes in fluid itself causing increase or decrease in its volume will not disturb operation of the brakes, and also so form the brake applying apparatus that if any air works into the brake tubing, it will not interfere with the proper operation of the brakes.

Another object of the invention is to prevent excessive pressure from being applied to the brakes and causing them to lock and thereby eliminate danger of accident occurring due to the improper application of the brakes.

Another object of the invention is to so construct the brake applying apparatus that it will be very strong and durable, and not liable to get out of order and need repairs, but at the same time will permit its elements to be taken apart in case repairs or adjustment are necessary.

The invention is illustrated in the accompanying drawings, wherein, Fig. 1 is a top plan view showing the improved brake applying apparatus, operatively connected with a transmission casing, the top of the reservoir being removed.

Fig. 2 is a side elevation looking at the outer side of the reservoir.

Fig. 3 is a sectional view taken along the line 3—3 of Fig. 1.

Fig. 4 is a transverse sectional view taken along the line 4—4 of Fig. 1.

Fig. 5 is an enlarged fragmentary view illustrating the formation and mounting a bell crank lever constituting part of a valve adjusting means.

Fig. 6 is an enlarged view of the valve adjusting means, portions of the same being shown in section.

Fig. 7 is a fragmentary sectional view taken on the line 7—7 of Fig. 6.

Fig. 8 is a fragmentary sectional view taken vertically through the outer wall of the reservoir.

Fig. 9 is a view illustrating a modified form of closure for interrupting circulation of fluid in the reservoir.

Fig. 10 is a diagrammatic view illustrating circulation of the fluid when an automobile is moving forwardly.

Fig. 11 is a fragmentary view illustrating circulation of the fluid when an automobile is moving rearwardly.

Fig. 12 is a fragmentary view showing the power shaft and valve adjusting sleeve of Figure 4 partially in elevation and partially in longitudinal section.

Fig. 13 is a fragmentary view illustrating a modified form of sleeve for connecting the power shaft and drive shaft.

Fig. 14 is a view illustrating another modified form of drive shaft.

Fig. 15 is a sectional view of another modified form of drive shaft and associated parts.

This improved hydraulic brake applying apparatus has been shown applied to the transmission casing 1 of an automobile so that it may receive its power from any preferred shaft of the transmission, but it is to be understood that it may be mounted when so desired upon any other portion of the automobile found suitable and receive its power from any rotating element.

The reservoir 2 may be formed of steel or any other desired material, and has side ears 3 through which bolts 4 are passed, in order to firmly secure the reservoir against the transmission casing or other support. This reservoir has its outer side wall 5 removably secured by bolts or screws 6, and has its open upper end closed by a top or upper wall 7 removably secured by screws 8 and formed with a filling neck 9 through which fluid may be poured into the reservoir when necessary. A closure plug 10 is threaded into the neck 9 and formed with a bore or port 11 having an outwardly closing check valve 12 formed therein so that air may enter the reservoir and prevent a vacuum from being formed therein.

A pump housing 13 is disposed vertically within the reservoir, where it is firmly secured against the inner face of the removable side wall 5 by screws 14, and by referring to Fig. 3, it will be seen that this pump housing defines a chamber 15 having passages 16 and 17 leading therefrom at opposite sides of the chamber. These passages 16 and 17 are to be selectively connected with a discharge port 18 and an inlet port 19. The discharge port 18 communicates with an outlet 20 formed through the side wall 5 so that fluid may enter a conduit 21 through which the fluid is to be led to hydraulic brakes B of a conventional construction as shown in Figure 10, and a branch passage 22 leads from the outlet 20 longitudinally through the wall 5 and may have its outer end closed by a plug 23 or another conduit may be threaded into the outer end of the passage 22 whereby fluid under pressure may be used for any purpose desired.

A pump shaft or drive shaft 24 extends through the upper portion of the chamber 15 and is rotatably supported by a bearing sleeve 25 projecting from the inner wall of the pump housing into the reservoir. The forward end of the pump shaft is rotatably received in a socket 26 formed in the inner face of the wall 5. Within the pump housing are located upper and lower impellers or pump elements 27 and 28, one of which is fixed upon the pump shaft and the other of which fits loosely upon a pin or axle 29 extending through the lower portion of the pump chamber as shown in Figs. 3 and 4 with one end portion fitted into a cup or socket 30 where it is secured by a pin 31. It will be readily seen that when the pump shaft is rotated the pump elements or impellers will rotate in the pump chamber and cause the fluid to be drawn inwardly through the inlet port 19 and passed outwardly through the discharge port 18. A side port 32 leads from the discharge port and opens into the reservoir, and unless this side port is closed, the fluid will circulate through the pump and reservoir without brake-applying pressure being exerted upon the fluid in the conduit 21.

This pump is in operation whenever the automobile is in motion, regardless whether it is moving forwardly or rearwardly, and it is therefore necessary to provide means for controlling flow of fluid from the inlet through the pump chamber and to the discharge port. In order to do so, I have provided a rotary valve 33 which extends through the pump housing below the pump chamber and has one end seated in a pocket 34 carried by the inner wall of the pump housing and its other end rotatably mounted in an opening 35 formed through the removable side wall of the reservoir. The opening 35 is closed by a plug 36 and this plug bears against a spring 37 in order to tension the spring and cause the valve to be firmly seated against packing 38 in the pocket 34. If so desired, the valve may taper inwardly and thereby not only limit its inward movement, but also cause it to have a tight fit in the opening 39 through which it passes.

A stem 40 projects from the inner end of the valve into the reservoir and is squared as shown in Fig. 4, so that the stem may be rotated a portion of a revolution depending on spacing of the ports and cause its ports 41 and 42 to register with the passages 16 and 17, as shown in Fig. 10, or as shown in Fig. 11. By observing these figures, it will be seen that in either adjustment of the valve, the fluid will be drawn through the inlet port and after passing through the pump chamber be delivered to the discharge port or passage, and no matter whether the automobile is moving forwardly or rearwardly, a circulation may take place through the pump chamber and reservoir and when the side port 32 is closed, pressure exerted upon fluid in the conduit 21 to apply the brakes.

In order to rotate the drive shaft 24 and cause circulation of the fluid when the automobile is in motion, the drive mechanism shown in Figures 4 and 12 may be used. This mechanism consists of a shaft 43 rotatably mounted in a bearing 44 formed through the lower portion of a casing 45 and this shaft carries a helical gear 46 which meshes with a helical gear 47 in the upper portion of the casing 45. The casing 45 is firmly secured against the transmission casing 1 by bolts 48 and the gear 47 is fixed upon a shaft 49 which may be the outer end of one of the transmission shafts, or may be a separate shaft extended inwardly into the transmission, and rotated therefrom whenever the automobile is in motion.

Necks 50 and 51 project from the reservoir and casing 45 in alignment with each other, and these necks slidably and rotatably mount a sleeve 52 intermediate the length of which is formed a partition 53 perforated as shown at 54, to provide an escape for pocketed fluid which is to act as a cushion at end of movement of partition 53. A gasket 55 prevents any danger of fluid leaking outwardly between the two necks. The sleeve 52 is formed with slots 56 extending spirally for a portion of the circumference of the sleeve, and in these slots is engaged a pin 57 projecting radially from the shaft 43. It will thus be seen that when the shaft is initially rotated in a given direction after being rotated in a reverse direction, the pin by engaging through the slots will cause the sleeve to be slid longitudinally for a short distance. Since the inner end portion of the sleeve receives the squared end portion 58 of the shaft 24, this pump shaft will rotate with the shaft 43 whenever the automobile is in motion.

As previously stated, the fluid passes through the pump chamber and passages communicating therewith in one direction when the automobile is moving forwardly and in a reverse direction when the car is backing, and as the fluid must always travel through the discharge port 18 in the same direction in order to establish a circulation through the pump housing and reservoir and apply pressure to the fluid in conduit 21, the valve 33 must be reversed when movement of the automobile is reversed. This valve is adjusted by imparting a partial rotation thereto in order to move its ports from the position shown in Fig. 10, to that shown in Fig. 11, and in order to do so there has been provided a collar 59 which fits upon the squared end of the valve stem and is secured firmly in place by a screw 60. One end of this screw is engaged by one end of a spring 61 which extends longitudinally in the reservoir, and has its other end anchored to an ear 62, projecting from a wall of the reservoir, and this spring serves to normally retain the valve in the position shown in Fig. 3 so that it will be properly disposed to apply the brakes when an automobile is moving forwardly.

An arm 63 projects from the collar 59 as shown in Figure 6 longitudinally of the valve stem, and at its free end terminates in a spherical head 64 received in a socket 65 formed at the lower end of a pitman 66. This pitman 66 extends upwardly in the reservoir and at its upper end is formed with a socket 67 in which is received a spherical head 68 formed at the free end of the arm 69 of a bell crank lever 70. This bell crank is carried by a mounting shaft 71 engaged through a bearing 72 formed upon the upper portion of the sleeve 25, and the second arm 73 of the bell crank carries a pin 74 about which are loosely engaged the eyes 75 formed at the free ends of arms 76 which project from a collar or yoke 77 loosely received in a circumferentially extending groove 78 formed in the sleeve or connection 52. By this arrangement, rocking motion will be imparted to the bell crank lever when the sleeve or connection 52 is moved longitudinally during initial rotation of the shaft 43 in a given direction, and the pitman 66 will be shifted vertically and rotate the valve in order to move it to either the position shown in Fig. 10, or that shown in Fig. 11. Plates 77' extend downwardly from the top 7 at opposite sides of the arms 76 and prevent the yoke from turning with the sleeve.

When the brakes are to be applied, circulation of fluid through the reservoir is to be interrupted by closing the side port 32 and thereby causing the pump elements or impellers to exert pressure upon the fluid in the conduit and cause the hydraulic brakes to be applied in the usual manner. In order to close the side port, there is employed a valve 79 slidable through a guide 80 projecting from one side of the pump housing and this valve has its upper end reduced to form neck or stem 81 straddled by forks at the free end of the arm 82 which projects radially from a sleeve 83 secured firmly upon a shaft 84. A pin 85 extends through the neck 81 and from an inspection of Fig. 3, it will be readily seen that when the shaft 84 is rotated in one direction, the valve will be moved to an opened position, whereas when the shaft is rotated in an opposite direction, the valve will be thrust downwardly into position to close the side port.

The shaft 84 is rotatably engaged through a bearing 85 in the wall 5 of the reservoir and upon its outer end is firmly fixed an arm 87 which extends downwardly therefrom as shown in Figs. 2 and 4. Through the free end portion of the lever 87 is passed a rod 88 which leads to a foot pedal 89 as shown in Figure 10. The rod 88 carries abutment nuts 91 to limit its movement through the lever 87 in one direction, and at its free end carries nuts 92. Between the nuts 92 and the lever, a coiled spring 93 is disposed about the rod with its ends bearing against washers 94. These washers bear against the lever, and the nuts 92, and by adjusting the nuts, the tension of the spring may be regulated. It will thus be seen that the rod will be permitted to have limited sliding movement through the lever 87 when the pedal is pressed upon to apply the brakes, and if the pressure should be too great and cause the wheels to tend to lock, the extra pressure may force the valve to an open position long enough to relieve the brakes of the excess pressure and cause the brakes to be properly applied.

In Fig. 9 there has been shown a modified form of valve. This valve is designated by the numeral 95 and is slidably mounted in the guide 80, similar to the valve 79, but is hollow and carries a plunger 96 yieldably held against downward movement relative to the valve by a spring 97 which takes the place of the spring 93. A pin 98 which projects radially from the plunger and is engaged in a slot 99 formed in the valve, guides sliding movement of the plunger and also limits its movement relative to the valve. A slotted arm 100 is pivoted at its lower end to a hinge ear extending upwardly from the valve as shown at 101, and through the slot in the arm is engaged a pin 102 carried by forks at the end of a lever 103 taking the place of the arm or lever 82. A stop 103' limits downward movement of the lever when closing the valve. By this arrangement the valve may be forced upwardly against action of the spring 97 in order to relieve the excess pressure. Therefore it acts as a safety valve. A set screw 104 is carried by the arm 103 with its lower end bearing against the upper end of the plunger, and by adjusting this screw, the tension of the spring 97 may be controlled in a manner similar to the tension of the spring 93. When this construction is employed there will be no danger of the brake-applying mechanism being tampered with by an unauthorized or inexperienced person.

In Figs. 13 to 15, there have been illustrated modified forms of power shafts which may be used in place of the power shaft 43. In the form shown in Fig. 13, the shaft 105 will be provided with a helical gear corresponding to the helical gear 46, but its inner end portion is squared as shown at 106, and this squared end of the power shaft is received in the internally squared end portion 107 of a sleeve or connection 108, taking the place of the sleeve 52.

The other end portion of the sleeve 108 is internally threaded for engagement with corresponding threads 109 formed upon a shaft 110, taking the place of the pump shaft 24, and when the shaft 105 is rotated initially in a given direction, the sleeve will be shifted longitudinally.

The shaft 111, shown in Fig. 14, has its outer end portion threaded as shown at 112, and this portion of the shaft carries a helical gear 113 corresponding to the gear 46, but internally threaded, so that when the gear is rotated by the gear 47 with which it will mesh, the shaft 111 will be shifted longitudinally. This shaft carries, at its inner end, a collar 114 formed with a circumferentially extending groove 115 to receive the yoke 77, and a socket 116 which is rectangular in cross section, is formed in the inner end portion of the shaft in order to receive the squared end portion of a shaft 117, corresponding to the pump shaft 24. In this form of the invention, the entire power shaft slides longitudinally in order to effect adjustment of the valve instead of a sleeve or connection between the pump shaft and the power shaft.

In Fig. 15, the squared end of the shaft 24 is engaged in a squared end portion of a hollow shaft 118 which is slidably received in the neck 50 and a worm gear 119 corresponding to the gear 46 is carried by this shaft, but has its opposite side faces recessed as shown at 120, and the gear is perforated as shown at 121 in order that fluid cushions may be provided in order to allow the gear to seat easily against a bushing 122 or sleeve 123 at the opposite side of the gear, and rotatably receiving the outer end of the hollow shaft. Since the gear 119 engages the helical gear 47, as shown in this figure, initial rotation of the worm in a direction opposite to the direction in which it has been rotating, will shift the hollow shaft longitudinally and impart adjusting movement to the valve 33, through the medium of a yoke engaged in the annular groove formed in a collar 124 mounted upon the inner end portion of the hollow shaft and secured thereon by a lock nut 125.

Having thus described my invention, that I claim as new and desire to secure by Letters Patent is:

1. A hydraulic brake applying apparatus comprising a reservoir, a conduit leading therefrom for conducting fluid to a brake, a pump for circulating fluid in said reservoir and applying pressure to fluid in said conduit, said pump having an inlet opening into the reservoir and a discharge communicating with the conduit, the discharge being provided with a side port opening into the reservoir, a closure for the side port slidably mounted for movement into and out of closing relation to the side port, a rocker shaft projecting out of said reservoir, an arm fixed upon said rocker shaft and projecting therefrom over said closure, a loose connection between the closure and arm whereby the closure may move toward an opened position after being closed, a plunger slidably carried by said closure, a spring between the closure and plunger, means to control tension of said spring, and manually actuated means to rotate said shaft and move the valve to a closed position.

2. In a hydraulic brake applying structure, a fluid reservoir having an outlet, a pump chamber in said reservoir, rotary impelling means in said chamber, a rotary drive shaft for said impelling means projecting from said chamber, said chamber having passages leading therefrom at opposite sides of the impelling means, and the chamber being formed with inlet and outlet ports, a valve rotatably mounted and formed with transverse bores to selectively connect the passages with the inlet and outlet ports, a conduit communicating with the outlet, the outlet port having a side port opening into said reservoir for circulation of fluid through the pump chamber and reservoir, a valve to close said side port normally open, and means to move the valve to a closed position and cause the pump to exert pressure upon fluid in the conduit.

3. In a hydraulic brake applying structure, a fluid reservoir having an outlet, a conduit leading from the outlet for communication with a brake, a pump housing in said reservoir having a chamber and passages leading from opposite sides thereof for connecting the chamber with the outlet and with an inlet, said inlet opening into said reservoir and a side port being provided adjacent the outlet and opening into the reservoir, impellers rotatably mounted in said chamber between said passages and having a rotary drive shaft projecting from the pump housing, a valve rockably carried by said housing and having ports to selectively connect the passages with the inlet and outlet, a rotatable power shaft for said drive shaft adapted to be rotated from a rotating element of a vehicle in accordance with the direction in which a vehicle is moving, means to adjust said valve actuated by initial movement of the power shaft in a given direction, and means to close said side port.

4. In a hydraulic brake applying structure, a fluid reservoir having an outlet, a conduit leading from the outlet for communication with a brake, a pump housing in said reservoir having a chamber and passages leading from opposite sides thereof for connecting the chamber with the outlet and with an inlet, said inlet opening into said reservoir and a side port being provided adjacent the outlet and opening into the reservoir, impellers rotatably mounted in said chamber between said passages and having a rotary drive shaft projecting from the pump housing, a valve rockably carried by said housing and having ports to selectively connect the passages with the inlet and outlet, a rotatable power shaft for said drive shaft adapted to be rotated from a rotating element of a vehicle in accordance with the direction in which a vehicle is moving, a sliding connection between said shafts having longitudinal movement when the power shaft is initially rotated in a given direction, means to adjust said valve actuated by longitudinal movement of said connection, and means to close said side port.

5. In a hydraulic brake applying structure, a fluid reservoir having an outlet, a conduit leading from the outlet for communication with a brake, a pump housing in said reservoir having a chamber and passages leading from opposite sides thereof for connecting the chamber with the outlet and with an inlet, said inlet opening into said reservoir and a side port being provided adjacent the outlet and opening into reservoir, impellers rotatably mounted in said chamber between said passages and having a rotary drive shaft projecting from the pump housing, a valve rockably carried by said housing and having ports to selectively connect the passages with the inlet and outlet, a rotatable power shaft for said drive shaft adapted to be rotated from a rotating element of a vehicle in accordance with the direction in which a vehicle is moving, means to close said side port and interrupt circulation of fluid through the reservoir and chamber to cause pressure to be exerted upon fluid in the conduit and apply the brake, a sliding connection between said shafts moved longitudinally when the power shaft is initially rotated in a given direction, and means to adjust said valve according to the direction in which the shaft rotates actuated by longitudinal movement of said connection.

6. In a hydraulic brake applying structure, a fluid reservoir having an outlet, a conduit leading from the outlet for communication with a brake, a pump housing in said reservoir having a chamber and passages leading from opposite sides thereof for connecting the chamber with the outlet and with an inlet, said inlet opening into said reservoir and a side port being provided adjacent the outlet and opening into reservoir, impellers rotatably mounted in said chamber between said passages and having a rotary drive shaft projecting from the pump housing, a valve rockably carried by said housing and having ports to selectively connect the passages with the inlet and outlet, a rotatable power shaft for said drive shaft adapted to be rotated from a rotating element of a vehicle in accordance with the direction in which a vehicle is moving, means to close said side port and interrupt circulation of fluid through the reservoir and chamber to cause pressure to be exerted upon fluid in the conduit and apply the brake, a sliding connection between said shafts moved longitudinally when the power shaft is initially rotated in a given direction, an arm extending radially from said valve, a pitman pivoted to said arm and extending upwardly in said reservoir, a bell crank pivotally mounted and having one arm pivoted to the upper end of said pitman, and a collar fitting loosely about the sliding connection and having an arm pivoted to the other arm of the bell crank whereby the valve will be adjusted when the connection is moved longitudinally.

7. A hydraulic brake applying apparatus comprising a reservoir having a wall formed with an outlet, a pump housing in said reservoir formed with a chamber having passages leading from opposite sides thereof to communicate one with a discharge duct leading to the outlet and the other with an inlet duct opening into the reservoir, the discharge duct having a side port opening into the reservoir, a closure for said port, a valve rockably mounted through said housing and having transverse ports to selectively establish communication between the ducts and passages according to the direction in which the valve is turned, impelling means rotatably mounted in said housing between said passages and having a rotary drive shaft, a power shaft rotatably mounted and adapted to receive rotary motion from a rotating shaft of a vehicle, a sleeve joining adjacent ends of the drive shaft and power shaft and having limited longitudinal movement when the power shaft is rotated, means actuated from said sleeve to rotate said valve to an adjusted position during initial rotation of the power shaft in a reversed direction, and manually controlled means to close said closure and cause the impelling means to exert brake applying pressure upon fluid in a conduit leading from the outlet to a hydraulic brake.

8. A hydraulic brake applying apparatus comprising a reservoir having a wall formed with an outlet, a pump housing in said reservoir formed with a chamber having passages leading from opposite sides thereof to communicate one with a discharge duct leading to the outlet and the other with an inlet duct opening into the reservoir, the discharge duct having a side port opening into the reservoir, a closure for said port, a valve rockably mounted through said housing and having transverse ports to selectively establish communication between the ducts and passages according to the direction in which the valve is turned, impelling means rotatably mounted in said housing between said passages and having a rotary drive-shaft, a power shaft rotatably mounted and adapted to receive rotary motion from a rotating shaft of a vehicle, a sleeve joining adjacent ends of the drive shaft and power shaft and having a partition intermediate its ends to limit sliding of the sleeve by engagement with ends of the shafts, one end portion of the sleeve and the end portion of the shaft engaged thereby being non-circular in cross section to prevent rotation of the sleeve about the shaft and the other end portion of the sleeve and shaft engaged thereby being formed with cooperating means to impart longitudinal movement to the sleeve.

9. A hydraulic brake applying apparatus comprising a reservoir having a wall formed with an outlet, a pump housing in said reservoir formed with a chamber having passages leading from opposite sides thereof to communication one with a discharge duct leading to the outlet and the other with an inlet duct opening into the reservoir, the discharge duct having a side port opening into the reservoir, a closure for said port, a valve rockably mounted through said housing and having transverse ports to selectively establish communication between the ducts and passages according to the direction in which the valve is turned, impelling means rotatably mounted in said housing between said passages and having a rotary drive shaft, a power shaft rotatably mounted and adapted to receive rotary motion from a rotating shaft of a vehicle, a sleeve joining adjacent ends of the drive shaft and power shaft and having a partition intermediate its ends to limit sliding of the sleeve by engagement with ends of the shaft, one end portion of the sleeve and the end portion of the shaft engaged thereby being non-circular in cross section to prevent rotation of the sleeve about the shaft and the other end portion of the sleeve and shaft engaged thereby being formed with intermeshing threads to slide the sleeve longitudinally when the power shaft is rotated, means actuated from said sleeve to rotate said valve to an adjusted position during initial rotation of the power shaft in a reversed direction, and manually controlled means to close said closure and cause the impelling means to exert brake applying pressure upon fluid in a conduit leading from the outlet to a hydraulic brake.

10. A hydraulic brake applying apparatus comprising a reservoir having a wall formed with an outlet, a pump housing in said reservoir formed with a chamber having passages leading from opposite sides thereof to communicate one with a discharge duct leading to the outlet and the other with an inlet duct opening into the reservoir, the discharge duct having a side port opening into the reservoir, a closure for said port, a valve rockably mounted through said housing and having transverse ports to selectively establish communication between the ducts and passages according to the direction in which the valve is turned, impelling means rotatably mounted in said housing between said passages and having a rotary drive shaft a power shaft rotatably mounted and adapted to receive rotary motion from a rotating shaft of a vehicle, a sleeve joining adjacent ends of the drive shaft and power shaft and having a partition intermediate its ends to limit sliding of the sleeve by engagement with ends of the shaft, one end portion of the sleeve and the end portion of the shaft engaged thereby being non-circular in cross section to prevent rotation of the sleeve about the shaft, the other end portion of the sleeve being formed with a spiral slot extending for a portion of its circumference, a pin extending radially from the shaft received in the last mentioned end portion of said sleeve and engaged in said slot to impart longitudinal movement to the sleeve when the power shaft is rotated, means actuated from said sleeve to rotate said valve to an adjusted position during initial rotation of the power shaft in a reversed direction, and manually controlled means to close said closure and cause the impelling means to exert brake applying pressure upon fluid in a conduit leading from the outlet to a hydraulic brake.

11. A hydraulic brake applying apparatus comprising a reservoir having a wall formed with an outlet, a pump housing in said reservoir formed with a chamber having passages leading from opposite sides thereof to communicate one with a discharge duct leading to the inlet and the other with an inlet duct opening into the reservoir, the discharge duct having a side port opening into the reservoir, a closure for said port, a valve rockably mounted through said housing and having transverse ports to selectively establish communication between the ducts and passages according to the direction in which the valve is turned, impelling means rotatably mounted in said housing between said passages and having a rotary drive shaft, a power shaft rotatably mounted and having one end slidably engaged with said drive shaft and held against rotation thereon, a gear carried by the power shaft to impart limited sliding movement to the power shaft when rotated from a rotating shaft of a vehicle, means actuated from said power shaft to rotate said valve to an adjusted position during sliding movement of the power shaft, and manually controlled means to close said closure and interrupt circulation of fluid in the reservoir and cause impelling means to exert brake applying pressure upon fluid in a conduit leading from the outlet to a brake.

12. In a hydraulic brake applying structure, a fluid reservoir, a pump chamber, impelling means in said chamber, a rotary drive shaft for said impelling means, passages communicating with said chamber, a regulator to control flow of fluid through the passages and being adjustable to permit reversal of the direction of flow of fluid through the passages and chamber, means actuated from said drive shaft to adjust said regulator when rotation of the drive shaft is reversed, a conduit leading from said regulator for connection with fluid brakes, the fluid having movement through said conduit towards the brakes in either position of said regulator, said conduit having an escape port opening into said reservoir, and a closure movable into and out of closing relation to the escape port and when closed yieldably held in a closed position.

13. In a hydraulic brake applying structure, a fluid reservoir, a pump chamber, impelling means in said pump chamber having a rotary drive shaft, means to transmit rotary motion to said shaft, said pump chamber having passages leading therefrom, a conduit for conducting fluid to fluid brakes, a valve adjustable to establish communication between said conduit and a selected passage of the valve chamber whereby fluid may be drawn from the reservoir and fed to the conduit when the drive shaft is rotating in either direction, means to adjust said valve when rotation of the drive shaft is reversed, said conduit having a port opening into said reservoir, and means to close said port when pressure is to be applied to fluid in the conduit.

In testimony whereof I affix my signature.

OSCAR J. FROCK.